United States Patent [19]

Fukatani

[11] Patent Number: 5,765,118
[45] Date of Patent: Jun. 9, 1998

[54] ESTIMATION METHOD OF MOVEMENT STATE VARIABLE IN TURNING OF AUTOMOTIVE VEHICLE

[75] Inventor: Katsumi Fukatani, Susono, Japan

[73] Assignee: Toyota Jidosha Kabushiki Kaisha, Toyota, Japan

[21] Appl. No.: 623,095

[22] Filed: Mar. 28, 1996

[30]  Foreign Application Priority Data

Mar. 30, 1995 [JP] Japan ................. 7-073832

[51] Int. Cl.$^6$ .................. B62D 6/00; G06F 19/00
[52] U.S. Cl. ........................ 701/72; 701/41
[58] Field of Search ............ 364/426.016, 424.051; 303/146; 701/72, 41

[56]  References Cited

U.S. PATENT DOCUMENTS

| | | | |
|---|---|---|---|
| 4,679,808 | 7/1987 | Ito et al. | 280/91 |
| 4,706,979 | 11/1987 | Kawabe et al. | 280/91 |
| 4,830,127 | 5/1989 | Ito et al. | 180/79.1 |
| 4,840,389 | 6/1989 | Kawabe et aol. | 280/91 |
| 4,872,116 | 10/1989 | Ito et al. | 364/424.05 |
| 4,951,198 | 8/1990 | Watanabe et al. | 364/424.05 |
| 5,268,841 | 12/1993 | Mouri | 364/424.05 |

FOREIGN PATENT DOCUMENTS

| | | |
|---|---|---|
| 62-088666 | 4/1987 | Japan . |
| 62-83247 | 4/1987 | Japan . |
| 2-45802 | 2/1990 | Japan . |
| 2-151569 | 6/1990 | Japan . |

*Primary Examiner*—Michael Zanelli
*Attorney, Agent, or Firm*—Kenyon & Kenyon

[57]  ABSTRACT

An estimation method of estimating a lateral slip angle and a yaw rate or a wheeled vehicle on a basis of a state equation of an observer to be applied with a real yaw rate as a reference input, the observer being designed on a basis of a turning movement model which defines a steer-angle of the vehicle as an input variable and defines the lateral slip angle and the yaw rate as a state variable, wherein a forward speed, a steer-angle, a yaw rate and a lateral acceleration of the vehicle are detected to estimate a lateral acceleration based on the lateral slip angle and yaw rate calculated on a basis of the state equation of the observer and the detected forward speed, a correction coefficient is calculated on a basis of a ratio of the detected lateral acceleration and the estimated lateral acceleration, and a factor of a cornering power defined in the state equation of the observer is multiplied by the calculated correction coefficient.

5 Claims, 10 Drawing Sheets

ESTIMATION METHOD OF MOVEMENT STATE VARIABLE IN TURNING OF AUTOMOTIVE VEHICLE

BACKGROUND OF THE INVENTION

1. Field of the Invention

The present invention relates to an estimation method of movement state variables in turning of a wheeled vehicle, and more particularly to a movement state estimation method of estimating one of plural movement state variables indicative of a lateral slip angle, a yaw rate, a lateral acceleration and the like in turning of a wheeled vehicle and another state variable on a basis of a state equation of an observer to be applied with one of real movement state variables as a reference input, the observer being designed on a basis of a turning movement model which defines physical variables indicative of a steer-angle, a steer-angle speed and the like of the vehicle as input variables and defines the movement state variables as state variables.

2. Description of the Prior Art

Disclosed in Japanese Patent Laid-open Publication 2(1990)-45802 is an estimation method wherein a steer-angle and a yaw-angle acceleration of a wheeled vehicle are detected to estimate a yaw rate and a lateral acceleration based on a movement equation of an observer using the detected steer-angle and yaw-angle acceleration. In Japanese Patent Laid-open Publication 62(1987)-83247), there is disclosed an estimation method of movement state variables of a wheeled vehicle wherein a forward speed and a steer-angle of the vehicle are detected to estimate a lateral movement velocity and a yaw rate by calculation based on a movement state model of the vehicle, and wherein a real lateral acceleration and a real yaw rate in turning of the vehicle are detected to calculate a lateral slip angle thereby to increase or decrease a cornering power of a turning movement model of the vehicle by a predetermined fixed value when a difference between the estimated yaw rate and the real yaw rate is more than a predetermined value or a difference between a ratio of the calculated lateral slip angle to the detected yaw rate and a ratio of the estimated lateral slip angle relative to the estimated yaw rate is more than a predetermined value during steady-state cornering of the vehicle.

In general, if a lateral slip angle of tires increases due to entry of a cornering force of tires relative to the lateral slip angle into a non-linear region, secular change of the tires, decrease of a frictional coefficient of the tires on a road surface or change in distribution of grounding loads of the tires, the cornering power of the tires continually will change in accordance with the foregoing various situations. In the former observer described above, however, accurate estimation of the yaw rate and lateral acceleration may not be realized since the cornering power applied to the movement state equation is fixed. Since in the latter estimation method of movement state variables of the vehicle, the movement state variables of the vehicle are calculated in a classic manner on a basis of the forward speed and steer-angle of the vehicle, there will occur an error in the movement state variables if unusual movement of the vehicle is caused by skidding of the tires. Although in the estimation method, the cornering power is corrected by the fixed value in the predetermined condition, accurate correction of the cornering force may not be realized. With such correction of the cornering force, however, accurate estimation of the movement state variables in turning of the vehicle may not be realized.

SUMMARY OF THE INVENTION

It is, therefore, a primary object of the present invention to provide an improved estimation method capable of more accurately estimating movement state variables in turning of a wheeled vehicle even if a cornering power of tires changes in various situations.

In FIGS. 1 and 2 of the drawings, there is illustrated an observer 1 designed on a basis of a turning movement model 1a of a wheeled vehicle which is adapted to be applied with physical variables indicative of a steer-angle, a steer-angle speed and the like of the vehicle as input variables $U(u_1, u_2)$ to define plural movement state variables in turning of the vehicle as a state variable $X(x_1, x_2)$. In the observer 1, one of the state variables $x_1$ is selected as a reference input to estimate another state variable $x_2$ based thereon. Since movement state variables of this kind change in accordance with a cornering power of tires of the vehicle, it is apparent that the system determinant of the observer includes variable factors of the cornering power.

In a first solution theory of the present invention illustrated in FIG. 1, an estimation operator unit 2 is provided to be applied with either one of state variables x1, x2 estimated by the observer 1 for calculating another movement state variable z* different from a movement state variable corresponding with the state variables $x_1$, $x_2$, and a correction operator unit 3 is provided to be applied with the calculated movement state variable z* and a corresponding real movement state variable z detected by a sensor (not shown) to calculate a correction value α based on a difference between the movement state variables z* and z thereby to correct variable factors of the cornering power in the system determinant on a basis of the calculated correction value α. Assuming that variable factors in turning of the vehicle have been selected as the movement state variables z* and z, a relationship between the real cornering power of tires and the variable factors of the cornering power in the system determinant is represented by the movement state variables z* and z since the movement state variable z changes in accordance with the cornering power. Thus, a correction value α optimal for correction of the cornering power can be calculated by the correction operator unit 3.

In a second solution theory of the prevent invention illustrated in FIG. 2, the correction operator unit 3 is adapted to be applied with the state variable $x_1$ as a reference input, and a movement state variable $x_1$* corresponding with the state variable $x_1$ is estimated by the observer 1 to calculate a correction value α. Thus, the correction value α optimal for correction of the cornering power can be calculated by the correction operator unit 3.

In the present invention, the first or second solution theory is adapted to provide an estimation method wherein variable factors of a cornering power in an observer are continuously corrected to precisely estimate an unobservable movement state variable in turning of a wheeled vehicle.

According to a first aspect of the present invention, there is provided an estimation method of estimating first and second movement state variables in turning of a wheeled vehicle on a basis of a state equation of an observer to be applied with a first real movement state variable as a reference input, the observer being designed on a basis of a turning movement model which defines a real physical variable indicative of a steer-angle of the vehicle as an input variable and defines the first and second movement state variables as a state variable, wherein the estimation method comprises the steps of detecting a real physical variable and a first real movement state variable and a third real movement state variable different from the first and second movement state variables; estimating a third movement state variable corresponding with the detected third real movement state variable on a basis of either one of the first and second movement state variables to be estimated; calculating a continuous correction value for correction of a cornering power defined in the state equation of the observer on a basis of a difference between the detected third real movement state variable and the estimated third movement state variable; and quantitatively correcting a factor of the cornering power by the calculated correction value.

According to a second aspect of the present invention, there is provided an estimation method of estimating a lateral slip angle $\beta^*$ and a yaw rate $\gamma^*$ on a basis of a state equation of an observer to be applied with a real yaw rate $\gamma$ as a reference input, the observer being designed on a basis of a turning movement model which defines a steer-angle $\delta f$, $\delta r$ of the vehicle as an input variable and defines the lateral slip angle $\beta^*$ and yaw rate $\gamma^*$ as a state variable, wherein the estimation method comprises the steps of detecting a real forward speed Vx, a real steer-angle $\delta f$, $\delta r$, a real yaw rate $\gamma$ and a real lateral acceleration Gy of the vehicle; estimating a lateral acceleration Gy* based on the estimated lateral slip angle $\beta^*$ and yaw rate $\gamma^*$ and the detected forward speed Vx of the vehicle; calculating a correction coefficient $\alpha$ based on a ratio of the detected real lateral acceleration Gy and the estimated lateral acceleration Gy*; and multiplying a factor of a cornering power Ff, Fr defined in the state equation of the observer by the calculated correction coefficient $\alpha$.

In the turning movement model, the lateral slip angle $\beta$, yaw rate $\gamma$, steer-angle $\delta f$, $\delta r$ and forward speed Vx are represented by the following equations (1)–(4) using each of cornering forces Ff, Fr of the front and rear road wheels.

$$d\beta/dt=(Ff+Fr)/MVx-\gamma \qquad (1)$$

$$d\gamma/dt=(a_fFf-a_rFr)/I_z \qquad (2)$$

$$Ff=c_f(\delta f-\beta-a_f\gamma/Vx) \qquad (3)$$

$$Fr=c_r(\delta r-\beta+a_r\gamma/Vx) \qquad (4)$$

where

M: mass of the vehicle body, $I_z$: yawing inertia moment of the vehicle body, $a_f$, $a_r$: each horizontal distance from the center of gravity of the vehicle to front and rear wheel axles, $c_f$, $c_r$: each cornering power of the front and rear road wheels.

A relationship of the lateral acceleration Gy and each of the cornering forces Ff, Fr of the front and rear road wheels is represented by the following equation.

$$Ff+Fr=MGy \qquad (5)$$

In the observer, the yaw rate $\gamma$ is applied as a reference input to estimate the lateral slip angle $\beta^*$ and yaw rate $\gamma^*$ on a basis of the state equation. Thus, the estimated lateral acceleration Gy* is calculated on a basis of the estimated lateral slip angle $\beta^*$, yaw rate $\gamma^*$ and the detected forward speed Vx, and a ratio of the detected lateral acceleration Gy relative to the estimated lateral acceleration Gy* is calculated as the correction coefficient $\alpha$ (=Gy/Gy*). As is understood from the equation (5), the correction coefficient $\alpha$ represents a ratio of a sum of a real cornering force Ff of the front road wheels and a real cornering force Fr of the rear road wheels relative to a sum of the estimated cornering forces Ff*, Fr* of the front and rear road wheels defined in the observer.

The variable factor of the cornering powers $c_f$, $c_r$ defined in the observer is multiplied by the correction coefficient $\alpha$. This means that the estimated cornering forces Ff*, Fr* of the front and rear road wheels are made $\alpha$ times. As a result, the sum of the real cornering forces Ff and Fr becomes equal to the sum of the estimated cornering forces Ff* and Fr*. Thus, the variable factors of the cornering powers $c_f$, $c_r$ in the observer can be reliably corrected, and the estimated lateral slip angle $\beta^*$ can be accurately calculated in spite of change of the cornering powers $c_f$, $c_r$.

According to a third aspect of the present invention, there is provided an estimation method of estimating a lateral slip angle and a yaw rate based on a state equation of an observer to be applied with a real yaw rate as a reference input, the observer being designed on a basis of a turning movement model which defines a steer-angle of the vehicle as an input variable and defines the lateral slip angle and the yaw rate as a state variable, wherein the estimation method comprises the steps of detecting a real forward speed, a real steer-angle, a real yaw rate and a real lateral acceleration of the vehicle; calculating a real cornering force based on the detected forward speed, yaw rate and lateral acceleration; estimating a cornering force based on the estimated lateral slip angle and yaw rate and the detected forward speed; calculating a correction coefficient based on a ratio of the calculated real cornering force relative to the estimated cornering force; and multiplying a factor of the estimated cornering power by the calculated correction coefficient.

In the estimation method described above, the real cornering forces Ff, Fr are calculated on a basis of the detected forward speed Vx, yaw rate $\gamma$ and lateral acceleration Gy, and the estimated cornering forces Ff*, Fr* are calculated on a basis of the estimated lateral slip angle $\beta^*$, yaw rate $\gamma^*$ and the detected forward speed Vx. Thus, a ratio of the calculated real cornering forces Ff, Fr relative to the estimated cornering forces Ff*, Fr* is calculated as the correction coefficient $\alpha f$, $\alpha r$. As is understood from the equations (3) and (4), the correction coefficients $\alpha f$, $\alpha r$ each represent a ratio of the real cornering forces Ff, Fr relative to the estimated cornering forces Ff*, Fr*. In the estimation method, the variable factors of the cornering forces $c_f$, $c_r$ in the state equation of the observer are multiplied by the correction coefficients $\alpha f$, $\alpha r$. This means that the estimated cornering forces Ff*, Fr* are made $\alpha f$, $\alpha r$ times, respectively. As a result, the estimated cornering forces Ff*, Fr* become equal to the real cornering forces Ff, Fr. Thus, the variable factors of the cornering forces $c_f$, $c_r$ defined in the observer can be reliably corrected, and the estimated lateral slip angle $\beta^*$ can be accurately calculated in spite of change of the cornering powers $c_f$, $c_r$.

According to a fourth aspect of the present invention, there is provided an estimation method of estimating first and second movement state variables based on a state equation of an observer to be applied with a first real movement state variable as a reference input, the observer being desgned on a basis of a turning movement model which defines a real physical variable indicative of a steer-angle of the vehicle as an input variable and defines the first and second movement state variables as a state variable, wherein the estimation method comprises the steps of detecting a real physical variable and a first real movement state variable; calculating a continuous correction value for correction of a cornering power defined in the state equation of the observer on a basis of a difference between the detected first real movement state variable and the estimated first movement state variable; and quantitatively correcting a factor of the cornering power on a basis of the calculated correction value.

According to a fifth aspect of the present invention, there is provided an estimation method of estimating a movement state variable including at least a lateral acceleration in turning of a wheeled vehicle on a basis of a state equation of an observer to be applied with a real lateral acceleration as a reference input, the observer being designed on a basis of a turning movement model which defines a steer-angle speed as an input variable and defines the movement state variable as a state variable, wherein the estimation method comprises the steps of detecting a real steer-angle speed and a real lateral acceleration of the vehicle; calculating a correction coefficient based on a ratio of the detected steer-angle speed relative to a lateral acceleration estimated on a basis of the state equation of the observer; and multiplying a factor of a cornering power defined in the state equation of the observer by the calculated correction coefficient.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
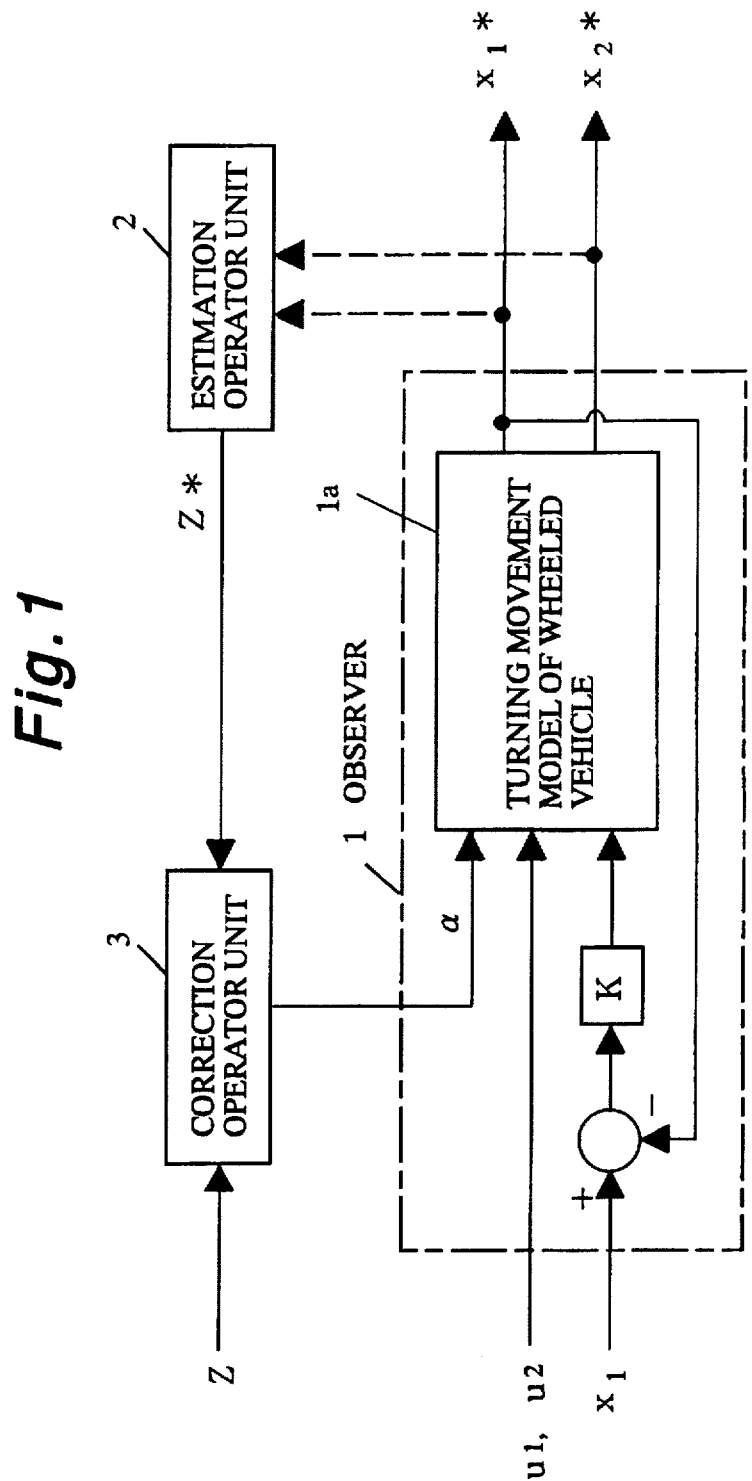
FIG. 1 is a block diagram for explanation of a first solution theory of the present invention.
Figure 2:
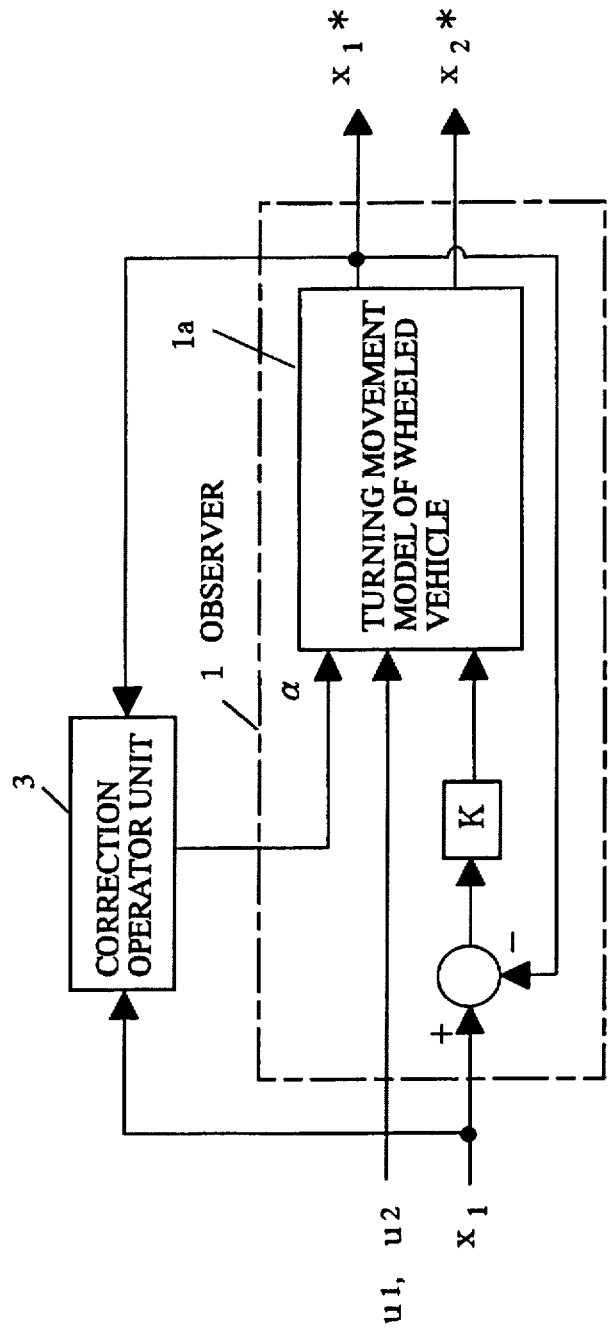
FIG. 2 is a block diagram for explanation of a second solution theory of the present invention.

An embodiment of the present invention realized on a basis of the first solution theory will be described hereinafter. In turning movement of a wheeled vehicle, variables $\delta f$, $\delta r$, $\beta$, $\gamma$ respectively indicative of a steer-angle of front road wheels, a steer-angle of rear road wheels, a lateral slip angle of the vehicle and a yaw rate are represented by the following equations:

$$d\beta/dt = (Ff + Fr)/MVx - \gamma \quad (6)$$

$$d\gamma/dt = (a_f Ff - a_r Fr)/I_z \quad (7)$$

$$Ff = c_p(\delta f - \beta - a_f \gamma/Vx) \quad (8)$$

$$Fr = c_p(\delta r - \beta + a_r \gamma/Vx) \quad (9)$$

where

M: mass of the vehicle body, $I_z$: yawing inertia moment of the vehicle body, $a_f$, $a_r$: each horizontal distance from the center of gravity of the vehicle to front and rear wheel axles, $c_p$: a common cornering power acting on the front and rear road wheels, Ff, Fr: each cornering force of the front and rear road wheels, Vx: forward speed of the vehicle.

When the cornering forces Ff, Fr are eliminated from the above equations, a state equation of a turning movement model of the vehicle is represented by the following equation.

$$\begin{bmatrix} d\beta/dt \\ d\gamma/dt \end{bmatrix} = \begin{bmatrix} a_{11} & a_{12} \\ a_{21} & a_{22} \end{bmatrix} \begin{bmatrix} \beta \\ \gamma \end{bmatrix} + \begin{bmatrix} b_{11} & b_{12} \\ b_{21} & b_{22} \end{bmatrix} \begin{bmatrix} \delta f \\ \delta r \end{bmatrix} \quad (10)$$

Provided that, factors $a_{11}$, $a_{12}$, $a_{21}$, $a_{22}$ of the system determinant and factors $b_{11}$, $b_{12}$, $b_{21}$, $b_{22}$ of the control determinant are represented by the following equations (11) and (12).

$$\begin{bmatrix} a_{11} & a_{12} \\ a_{21} & a_{22} \end{bmatrix} = \begin{bmatrix} -\dfrac{2c_p}{MVx} & -1 - \dfrac{a_f c_p - a_r c_p}{MVx^2} \\ -\dfrac{a_f c_p - a_r c_p}{I_z} & -\dfrac{a_f^2 c_p + a_r^2 c_p}{I_z Vx} \end{bmatrix} \quad (11)$$

$$\begin{bmatrix} b_{11} & b_{12} \\ b_{21} & b_{22} \end{bmatrix} = \begin{bmatrix} \dfrac{c_p}{MVx} & \dfrac{c_p}{MVx} \\ \dfrac{a_f c_p}{I_z} & \dfrac{a_r c_p}{I_z} \end{bmatrix} \quad (12)$$

Accordingly, an observer is provided on a basis of the state equation (10) to be applied with the yaw rate $\gamma$ as an observable state variable (a reference input). Assuming that the specification M, $I_z$, $a_f$, $a_r$, $c_p$ of the vehicle each are defined as constant, the yaw rate $\gamma$ and lateral slip angle $\beta$ can be estimated when the forward speed Vx, steer-angles $\delta f$, $\delta r$ of the front and rear road wheels and yaw rate $\gamma$ are detected. Hereinafter, a variable estimated by the observer is referred to an estimated variable, and each of the estimated variables is represented with a star mark *.

Figure 10:
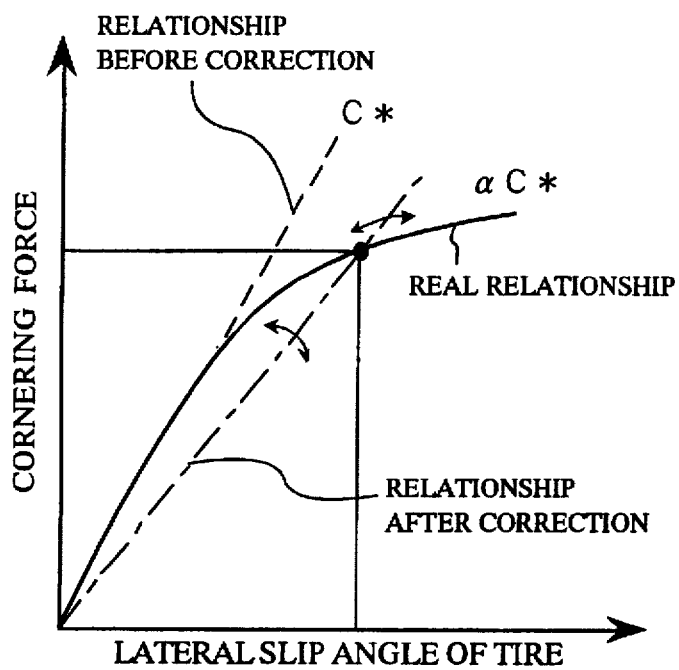
FIG. 10 is a graph showing a cornering force in relation to a lateral slip angle of tires.
Figure 11:
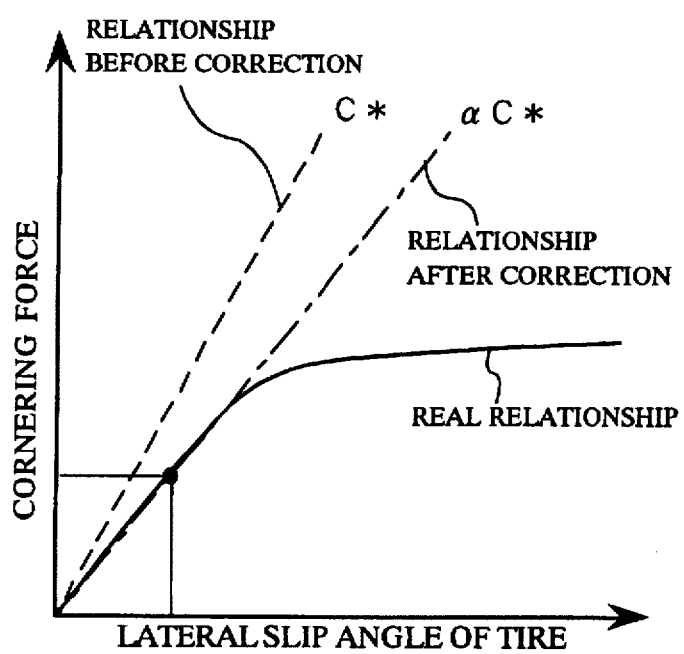
FIG. 11 is a graph showing a cornering force in relation to a lateral slip angle of tire.

When the cornering power $c_p$ (the changing ratio of the cornering force relative to the lateral slip angle) changes as shown in FIGS. 10 and 11 due to entry of the cornering force relative to the lateral slip angle into a non-linear range, secular change of the tires, decrease of a frictional coefficient of the tires on road surfaces, change in distribution of grounding loads, etc., accurate estimation of the lateral slip angle may not be realized. Assuming that a correction coefficient of the cornering power $c_p$ is defined as "α", the cornering power in the observer is represented by $\alpha c_p$. In this case, respective cornering forces of the front and rear road wheels estimated by the observer become aFf*, aFr*. In the case that real cornering forces of the front and rear road wheels are respectively represented by Ff, Fr, the lateral slip angle and yaw rate are accurately estimated if a correction coefficient α to satisfy Ff=aFf*, Fr=aFr* is found. In application of the correction coefficient α, the estimated cornering forces $\alpha Ff^*$, $\alpha Fr^*$ and the real cornering forces $Ff$, $Fr$ are represented by the following equation.

$$Ff+Fr=\alpha Ff^*+\alpha Fr^* \tag{13}$$

Assuming that a real lateral acceleration $Gy$ is detected as $Ff+Fr=MGy$ ... (14), a lateral acceleration $Gy^*$ estimated by the observer is represented by the following equation.

$$Ff+Fr^*=MGy^* \tag{15}$$

When the estimated cornering forces $\alpha Ff^*$, $\alpha Fr^*$ and the real cornering forces $Ff$, $Fr$ are eliminated from the equations (13)–(15), the correction coefficient $\alpha$ is represented by the following equation.

$$\alpha = Gy/Gy^* \tag{16}$$

When the calculated coefficient $\alpha$ is fed back to the turning movement model of the vehicle to correct the cornering power $c_p$, the lateral slip angle $\beta^*$ and yaw rate $\gamma^*$ can be accurately estimated.

Figure 3:
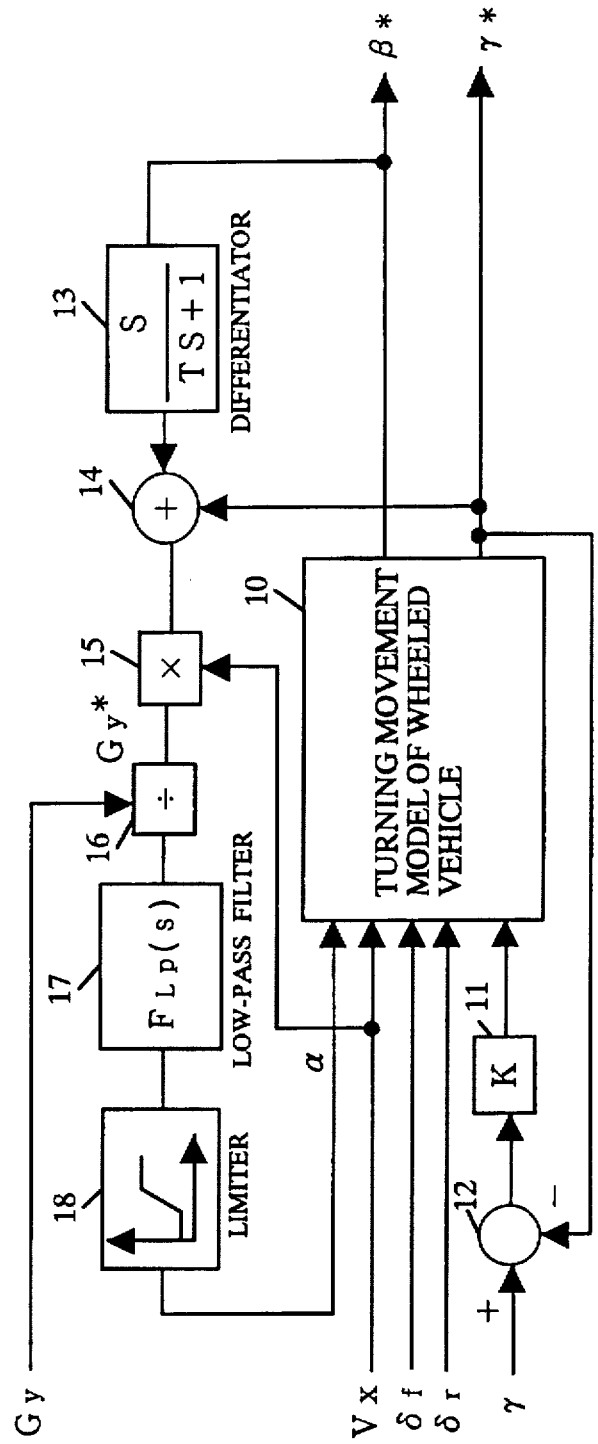
FIG. 3 is a block diagram of an observer including a turning movement model of a wheeled vehicle and a correction circuit for correcting a cornering power in the observer.

Hereinafter, an observer provided on a basis of the foregoing theory will be described. As shown in FIG. 3, the observer includes a turning movement model 10 of the vehicle, a gain-operator unit 11 to be applied with a real yaw rate $\gamma$ as a reference input through a deviation-operator unit 12. A state equation $dx/dt=AX+BU$ of the turning movement model 10 is represented by the following equations (17)–(19), and an output equation $Y=CX$ is represented by the following equation (20).

$$\begin{bmatrix} d\beta*/dt \\ d\gamma*/dt \end{bmatrix} = \begin{bmatrix} a_{11} & a_{12} \\ a_{21} & a_{22} \end{bmatrix}\begin{bmatrix} \beta^* \\ \gamma^* \end{bmatrix} - \begin{bmatrix} b_{11} & b_{12} \\ b_{21} & b_{22} \end{bmatrix}\begin{bmatrix} \delta f \\ \delta r \end{bmatrix} \tag{17}$$

$$\begin{bmatrix} a_{11} & a_{12} \\ a_{21} & a_{22} \end{bmatrix} = \begin{bmatrix} -\dfrac{2\alpha c_p}{MVx} & -1 - \dfrac{\alpha c_p(a_f - a_r)}{MVx^2} \\ -\dfrac{\alpha c_p(a_f - a_r)}{I_z} & -\dfrac{\alpha c_p(a_f^2 + a_r^2)}{I_z Vx} \end{bmatrix} \tag{18}$$

$$\begin{bmatrix} b_{11} & b_{12} \\ b_{21} & b_{22} \end{bmatrix} = \begin{bmatrix} \dfrac{\alpha c_p}{MVx} & \dfrac{\alpha c_p}{MVx} \\ \dfrac{\alpha a_f c_p}{I_z} & \dfrac{\alpha a_r c_p}{I_z} \end{bmatrix} \tag{19}$$

$$Y = [0\ 1]\begin{bmatrix} \beta^* \\ \gamma^* \end{bmatrix} \tag{20}$$

The gain-operator unit 11 is adapted to multiply a deviation of $\gamma-\gamma^*$ from the deviation operator unit 12 by a gain $K$ defined by the following equation (12) and to apply a resultant of the multiplication to the turning movement model 10 as a feedback data.

$$\begin{bmatrix} k_1 \\ k_2 \end{bmatrix} \tag{21}$$

The turning movement model 10 of the vehicle is provided with a feedback circuit including a differentiator 13, an adder 14, a multiplier 15, a subtracter 16, a low-pass filter 17 and a limiter 18 for correction of a variable factor of the cornering power $c_p$ in the movement model 10. The differentiator 13, adder 14 and multiplier 15 are adapted to execute the following equation for calculation of an estimated lateral acceleration $Gy^*$.

$$Gy^* = (d\beta S^*/dt + \gamma^*)Vx \tag{22}$$

The subtracter 16 is adapted to execute the above equation (16) for calculation of a correction coefficient "$\alpha$". The low-pass filter 17 is defined by the following transmission function (23) of a cut-off angle frequency $\omega c$ (for instance, about 20 rad/s) to eliminate high frequency noise of the correction coefficient "$\alpha$".

$$F_{LP}(S) = \dfrac{\omega c}{s + \omega c} \tag{23}$$

where the character "s" is a Laplace operator. The limiter 18 is adapted to maintain the correction coefficient "$\alpha$" in a range between a lower limit value $\alpha min$ (for instance, 0.2) and an upper limit value $\alpha max$ (for instance, 1.2).

A state equation or a differential equation of the observer described above is represented as described below.

$$dX^*/dt = (A - KC)X^* + K\gamma + BU \tag{24}$$

The state equation (24) can be rewritten into the following equation using the factors defined by the equations (17)–(21).

$$\begin{bmatrix} d\beta*/dt \\ d\gamma*/dt \end{bmatrix} = \begin{bmatrix} a_{11} & a_{12} - k_1 \\ a_{21} & a_{22} - k_2 \end{bmatrix}\begin{bmatrix} \beta^* \\ \gamma^* \end{bmatrix} + \begin{bmatrix} k_1 \\ k_2 \end{bmatrix}\gamma + \begin{bmatrix} b_{11} & b_{12} \\ b_{21} & b_{22} \end{bmatrix}\begin{bmatrix} \delta f \\ \delta r \end{bmatrix} \tag{25}$$

When poles $p_1$, $p_2$ of the observer each are selected as an appropriate value (for instance, about $-20$), the estimated lateral slip angle $\beta^*$ and yaw rate $\gamma^*$ converge. Provided that, the factors $k_1$, $k_2$ of the feedback gain $K$ are represented by the following equations (26), (27).

$$k_1 = \dfrac{p_1 p_2 - a_{11}(a_{11} + p_1 + p_2)}{a_{21}} + a_{12} \tag{26}$$

$$k_2 = a_{11} + a_{22} - p_1 - p_2 \tag{27}$$

The observer is applied with a real forward speed $Vx$ of the vehicle, real steer-angles $\delta f$, $\delta r$ of the front and rear road wheels, a real yaw rate $\gamma$ and a real lateral acceleration $Gy$ to calculate an estimated lateral slip angle $\beta^*$ and an estimated yaw rate $\gamma^*$ based on the equation (25). In this calculation, the correction coefficient "$\alpha$" is calculated as a ratio of the real lateral acceleration $Gy$ relative to the estimated lateral acceleration $Gy^*$ under control of the differentiator 13, adder 14, multiplier 15, subtracter 16, low-pass filter 17 and limiter 18. Thus, the estimated lateral slip angle $\beta^*$ and yaw rate $\gamma^*$ can be accurately calculated on a basis of a cornering power $\alpha c_p$ corrected by the correction coefficient "$\alpha$".

Figure 4:
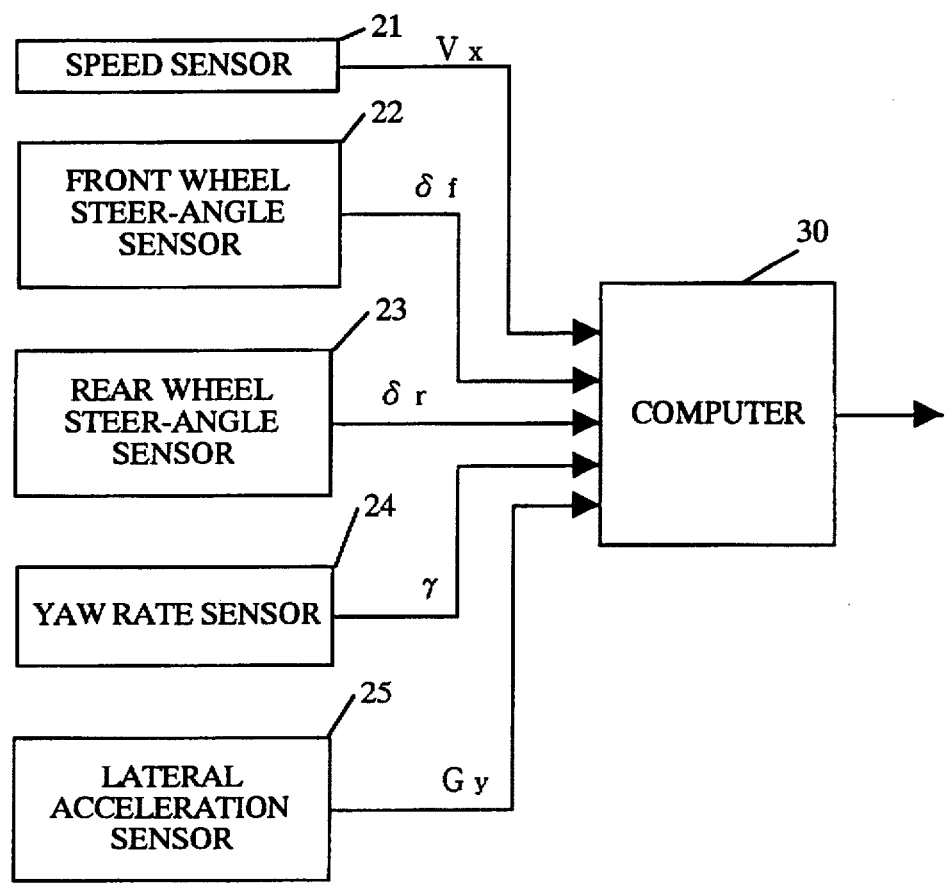
FIG. 4 is a block diagram of an apparatus for estimating movement state variables in turning of the vehicle in first to third practical embodiments of the present invention.
Figure 5:
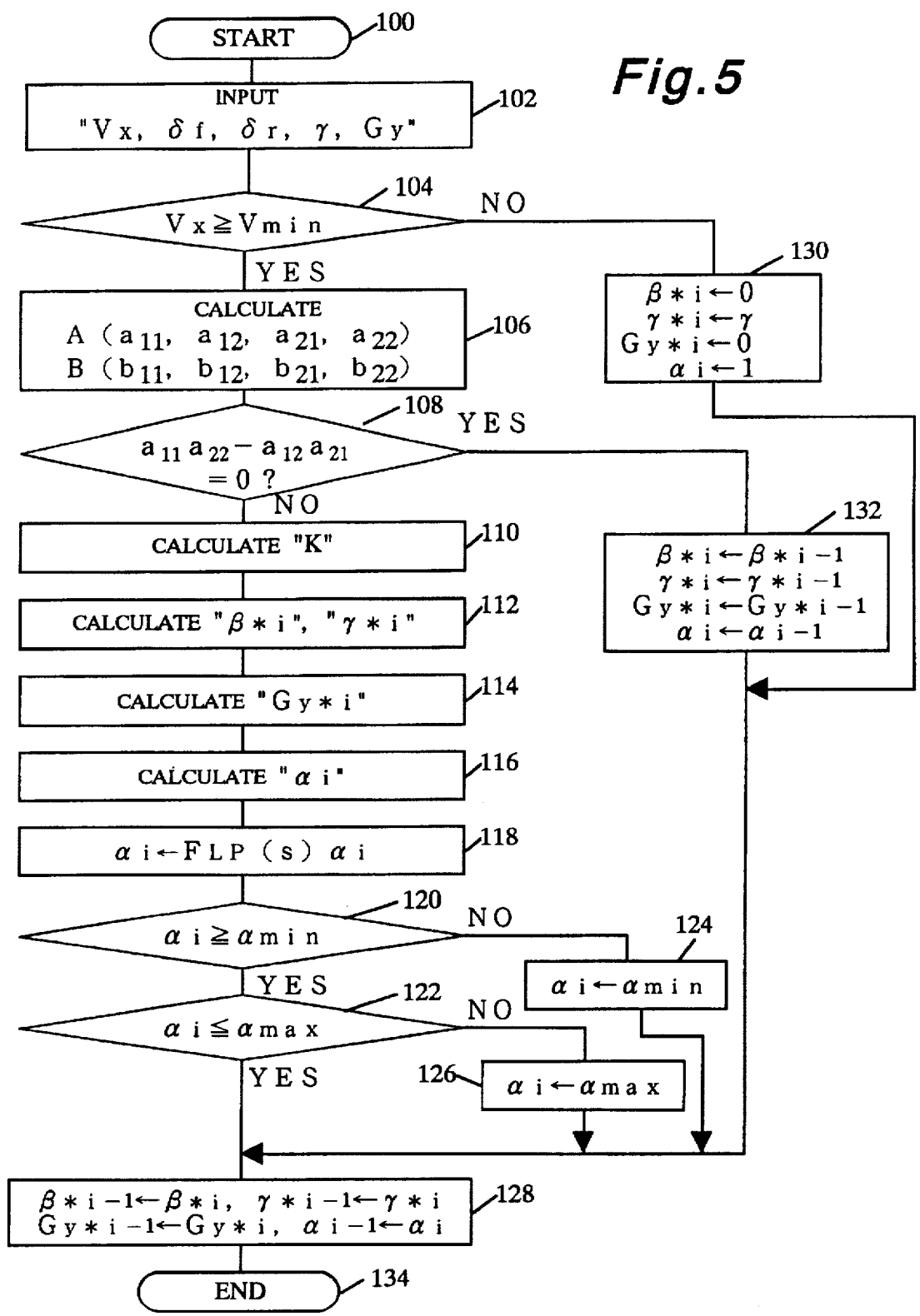
FIG. 5 is a flow chart of a program executed by a microcomputer shown in FIG. 4 in the first practical embodiment.

Hereinafter, a first practical embodiment realized by program processing of the foregoing observer will be described. As shown in FIG. 4, a wheeled vehicle equipped with this embodiment has a vehicle speed sensor 21 arranged to detect a real forward speed $Vx$ of the vehicle, steer-angle sensors 22, 23 arranged to detect real steer-angles $\delta f$, $\delta r$ of the front and rear road wheels, a yaw rate sensor 24 arranged to detect a real yaw rate $\gamma$ of the vehicle and a lateral acceleration sensor 25 arranged to detect a lateral acceleration $Gy$ of the vehicle. The sensors 21–25 are connected to a microcomputer 30 which is programmed to repeatedly execute a program shown by a flow chart in FIG. 5 upon each lapse of a predetermine time T under control of an internal timer.

In operation, the computer 30 starts at step 100 to execute the program and reads out at step 102 input signals respectively indicative of a forward speed $Vx$, steer-angles $\delta f$, $\delta r$ of the front and rear road wheels, a yaw rate $\gamma$ and a lateral acceleration $Gy$. Subsequently, the computer 30 determines at step 104 whether the forward speed Vx is higher than a predetermined speed Vmin (for instance, 5 Km/h) or not. If the answer at step 104 is "No", the program proceeds to step 130 where the computer 30 sets a presently estimated lateral slip angle β*i as "0", a presently estimated yaw rate γ*i as the real yaw rate γ, a presently estimated lateral acceleration Gy*i as "0" and a present correction coefficient αi as "1". Thereafter, the computer 30 renews at step 128 previously estimated lateral slip angle β*i-1, yaw rate γ*i-1, lateral acceleration Gy*i-1 and correction coefficient αi-1 with the presently estimated lateral slip angle β*i, yaw rate γ*i, lateral acceleration Gy*i and correction coefficient αi and finishes at step 134 execution of the program.

If the answer at step 104 is "Yes", the program proceeds to step 106 where the computer 30 calculates factors $a_{11}$, $a_{12}$, $a_{21}$, $a_{22}$, $b_{11}$, $b_{12}$, $b_{21}$, $b_{22}$ based on the equations (18) and (19) and causes the program to proceed to step 108. At step 108, the computer 30 determines whether "$a_{11}a_{22}-a_{12}a_{21}$" is "0" or not. The processing at step 108 is executed to avoid dispersion of the estimated lateral slip angle β* or yaw rate γ in a condition where "$a_{11}a_{22}-a_{12}a_{21}$" is "0". Thus, the computer 30 determines a "Yes" answer at step 108 and sets at step 132 the presently estimated lateral slip angle β*i, yaw rate γ*i, lateral acceleration Gy*i and correction coefficient αi respectively as the previously estimated lateral slip angle β*i-1, yaw rate γ*i-1, lateral acceleration Gy*i-1 and correction coefficient αi-1. Subsequently, the computer 30 executes the renewal processing at step 128 and finishes at step 134 execution of the program.

If the answer at step 108 is "No", the program proceeds to step 110 where the computer 30 calculates factors $k_1$, $k_2$ of a feedback gain K based on the equations (26) and (27) and causes the program to proceed to step 112. At step 112, the computer 30 calculates a presently estimated lateral slip angle β*i and a presently estimated yaw rate γr*i based on the state equation (25) using the calculated factors "$a_{11}a_{22}-a_{12}a_{21}$" and "$k_1$, $k_2$" and the read out data "δf, δr, γ". In this calculation, it is preferable that bilinear transformation or Tustin transformation is introduced to convert the state equation (25) into a discrete system in consideration with the time interval T thereby to progressively calculate the presently estimated lateral slip angle β*i and yaw rate γ*i based on the previously estimated lateral slip angle β*i-1 and yaw rate γ*i-1.

After processing at step 112, the computer 30 calculates at step 114 a differential value dβ*i/dt of an estimated lateral slip angle β* and calculates a presently estimated lateral acceleration Gy*i based on the equation (22) using the calculated differential value dβ*i/dt, the presently estimated yaw rate γ*i and the real forward speed Vx of the vehicle. At the following step 116, the computer 30 calculates a present correction coefficient αi based on the equation (16) using the calculated lateral acceleration Gy*i and the real lateral acceleration Gy. When the program proceeds to step 118, the computer 30 executes the low-pass filter processing defined by the transmission function of the equation (23) and executes processing at step 120–126 to define the processed present correction coefficient αi in a range between the lower limit value αmin and upper limit value αmax. Thereafter, the computer 30 renews at step 128 the previously estimated lateral slip angle β*i-1, yaw rate γ*i-1, lateral acceleration Gy*i-1 and correction coefficient αi-1 with the presently estimated lateral slip angle β*i, yaw rate γ*i, lateral acceleration Gy*i and correction coefficient αi and finishes at step 134 execution of the program.

Consequently, even if each cornering power $c_p$ of the front and rear road wheels changes due to increase of the lateral slip angle, secular change of tires, decrease of a frictional coefficient of the tires on road surfaces, change in distribution of grounding loads of the tires, the cornering power $c_p$ is corrected by the correction coefficient "α" so that the estimated lateral slip angle β* and the estimated yaw rate γ* are accurately calculated on a basis of the corrected cornering power. Thus, the estimated lateral slip angle β* can be adapted to various control of the vehicle. The estimated lateral slip angle β* may be also multiplied by the real forward speed Vx to calculate a lateral speed Vy=β*Vx for various control of the vehicle.

A second practical embodiment realized on a basis of the first solution theory of the present invention will be described hereinafter. In this embodiment, each cornering power of the front and rear road wheels is separately represented as $c_f$ and $c_r$. Although in this embodiment the equations (6) and (7) are satisfied, the equations (8) and (9) are rewritten into the following equations.

$$Ff=c_f(\delta f-\beta-a_f\gamma/Vx) \tag{28}$$

$$Fr=c_r(\delta r-\beta+a_r\gamma/Vx) \tag{29}$$

When cornering forces Ff, Fr are eliminated from the equations (6), (7) and (28), (29), a state equation of the turning movement model of the vehicle is represented as described below.

$$\begin{bmatrix} d\beta/dt \\ d\gamma/dt \end{bmatrix} = \begin{bmatrix} a_{11} & a_{12} \\ a_{21} & a_{22} \end{bmatrix} \begin{bmatrix} \beta \\ \gamma \end{bmatrix} + \begin{bmatrix} b_{11} & b_{12} \\ b_{21} & b_{22} \end{bmatrix} \begin{bmatrix} \delta f \\ \delta r \end{bmatrix} \tag{30}$$

Provided that, the factors $a_{11}$, $a_{12}$, $a_{21}$, $a_{22}$ of the system determinant and the factors $b_{11}$, $b_{12}$, $b_{12}$, $b_{22}$ of the control determinant are represented by the following equations.

$$\begin{bmatrix} a_{11} & a_{12} \\ a_{21} & a_{22} \end{bmatrix} = \begin{bmatrix} -\frac{c_f+c_r}{MVx} & -1-\frac{a_f c_f-a_r c_r}{MVx^2} \\ -\frac{a_f c_f-a_r c_r}{I_z} & -\frac{a_f^2 c_r+a_r^2 c_r}{I_z Vx} \end{bmatrix} \tag{31}$$

$$\begin{bmatrix} b_{11} & b_{12} \\ b_{21} & b_{22} \end{bmatrix} = \begin{bmatrix} \frac{c_f}{MVx} & \frac{c_r}{MVx} \\ \frac{a_f c_f}{I_z} & -\frac{a_r c_r}{I_z} \end{bmatrix} \tag{32}$$

Accordingly, an observer is provided on a basis of the state equation (30) to be applied with the yaw rate γ as an observable state variable. Assuming that the specification M, Iz, $a_f$, $a_r$, $c_f$, $c_r$ of the vehicle each are defined as constant, a lateral slip angle β can be estimated together with the yaw rate γ when a forward speed Vx of the vehicle, steering angles δf, δr of the front and rear road wheels and a yaw rate γ are detected.

When each cornering power $c_f$, $c_r$ changes in various situations as shown in FIGS. 10 and 11, accurate estimation of the lateral slip angle β may not be realized. Assuming that each cornering power in the observer is represented as $\alpha_f c_f$, $\alpha_r c_r$ in assumption of correction coefficients αf, αr to the cornering power, estimated cornering forces of the front and rear road wheels in the observer are represented by $\alpha_f Ff^*$, $\alpha_r Fr^*$. Thus, if the correction coefficients $\alpha_f$, $\alpha_r$ to satisfy Ff=$\alpha_f Ff^*$, Fr=$\alpha_r Fr^*$ could be found, the lateral slip angle and yaw rate in the observer would be accurately estimated.

In the observer including the turning movement model of the vehicle, the following equations (33), (34) are obtained on a basis of balance of a lateral resultant force and a moment of the vehicle body.

$$Ff^*+Fr^*=MGy^*=M(d\beta^*/dt+\gamma^*)Vx \tag{33}$$

$$a_f F_f^* - a_r F_r^* = I_z(d\gamma^*/dt) \quad (34)$$

Based on the equations (33) and (34), estimated cornering forces Ff*, Fr* of the front and rear road wheels are represented by the following equations, respectively.

$$F_f^* = \{a_f M V_x(d\beta^*/dt+\gamma^*)+I_z(d\gamma^*/dt)\}/(a_f+a_r) \quad (35)$$

$$F_r^* = \{a_r M V_x(d\beta^*/dt+\gamma^*)-I_z(d\gamma^*/dt)\}/(a_f+a_r) \quad (36)$$

Assuming that real cornering forces of the front and rear road wheels are represented by Ff, Fr, the following equations (37) and (38) are obtained.

$$F_f = \frac{\{a_r M V_x(d\beta/dt+\gamma) + I_z(d\gamma/dt)\}}{(a_f+a_r)} \quad (37)$$

$$F_r = \frac{\{a_f M V_x(d\beta/dt+\gamma) - I_z(d\gamma/dt)\}}{(a_f+a_r)} \quad (38)$$

On the other hand, the real lateral slip angle velocity dβ/dt is represented by the following equation using the detected lateral acceleration Gy, forward speed Vx and yaw rate γ.

$$d\beta/dt = Gy/V_x - \gamma \quad (39)$$

Accordingly, the correction coefficients $\alpha_f$, $\alpha_r$ can be calculated on a basis of the equations Ff=$\alpha_f$Ff*, Fr=$\alpha_r$Fr* and the foregoing equations (35)–(39). When the calculated coefficients $\alpha_f$, $\alpha_r$ are fed back to the turning movement model of the vehicle and multiplied by the cornering power $c_f$, $c_r$ in the movement model, the lateral slip angle β* and yaw rate γ* can be accurately estimated.

Figure 6:
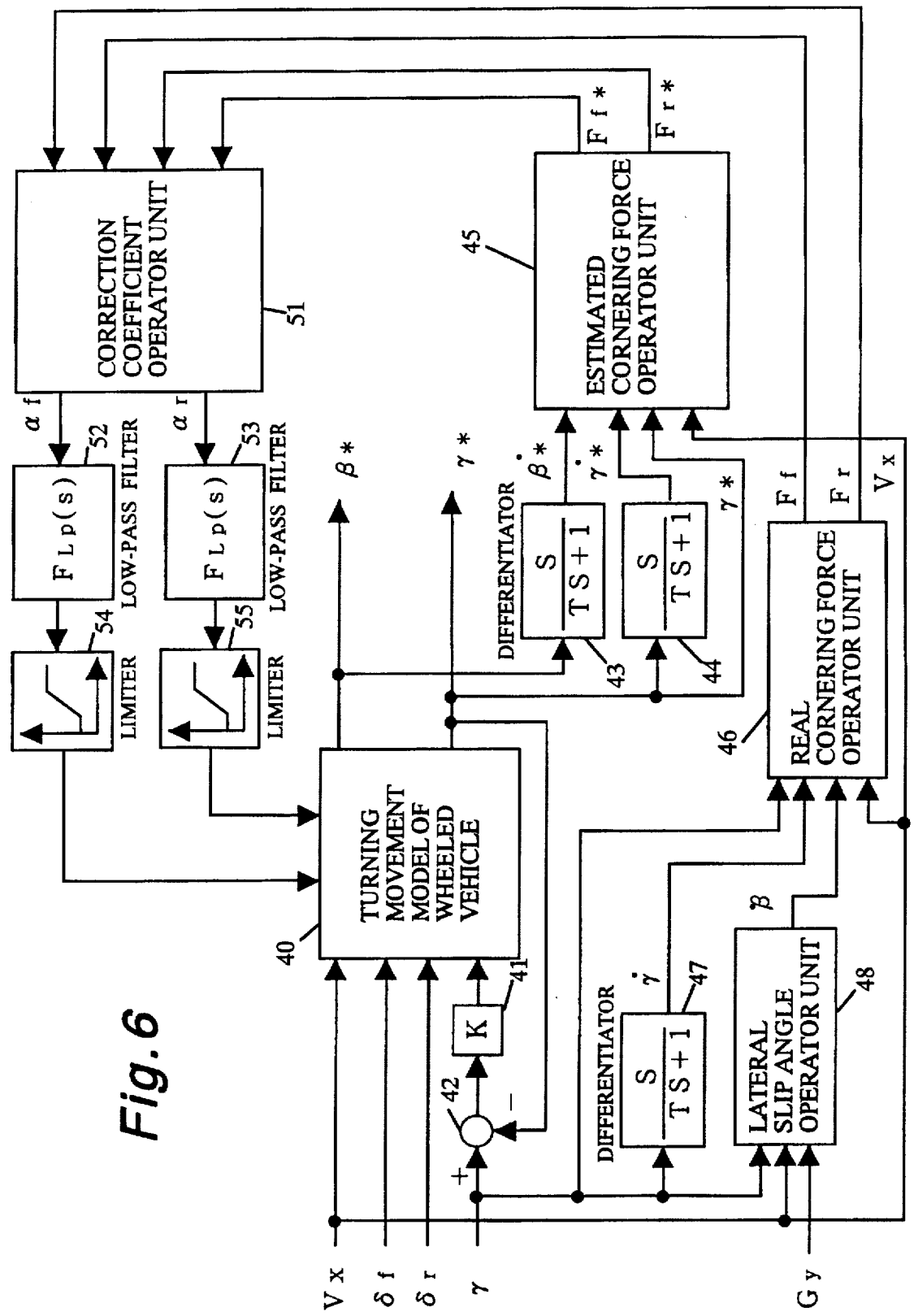
FIG. 6 is a block diagram of an observer including a turning movement model of a wheeled vehicle in the second practical embodiment of the present invention and a correction circuit for correcting a cornering power in the observer.

Hereinafter, an observer provided on a basis of the foregoing theory will be described. As shown in FIG. 6, the observer includes a turning movement model 40 of the vehicle, a gain-operator unit 41 to be applied with a yaw rate γ as a reference input and a deviation-operator unit 42. A state equation dx/dt=AX+BU of the turning movement model 40 is represented by the following equations (40)–(42).

$$\begin{bmatrix} d\beta^*/dt \\ d\gamma^*/dt \end{bmatrix} = \begin{bmatrix} a_{11} & a_{12} \\ a_{21} & a_{22} \end{bmatrix} \begin{bmatrix} \beta^* \\ \gamma^* \end{bmatrix} + \begin{bmatrix} b_{11} & b_{12} \\ b_{21} & b_{22} \end{bmatrix} \begin{bmatrix} \delta f \\ \delta r \end{bmatrix} \quad (40)$$

$$\begin{bmatrix} a_{11} & a_{12} \\ a_{21} & a_{22} \end{bmatrix} = \begin{bmatrix} -\frac{\alpha_f c_f + \alpha_r c_r}{MV_x} & -1 - \frac{a_f \alpha_f c_f - a_r \alpha_r c_r}{MV_x^2} \\ -\frac{a_f \alpha_f c_f - a_r \alpha_r c_r}{I_z} & -\frac{a_f^2 \alpha_f c_f + a_r^2 \alpha_r c_r}{I_z V_x} \end{bmatrix} \quad (41)$$

$$\begin{bmatrix} b_{11} & b_{12} \\ b_{21} & b_{22} \end{bmatrix} = \begin{bmatrix} \frac{\alpha_f c_f}{MV_x} & \frac{\alpha_r c_r}{MV_x} \\ \frac{a_f \alpha_f c_f}{I_z} & -\frac{a_r \alpha_r c_r}{I_z} \end{bmatrix} \quad (42)$$

In the observer, an output equation Y=CX is represented by the equation (20), and a gain K of the gain-operator unit 41 is represented by the equation (21).

The estimated lateral slip angle β* calculated in the turning movement model 40 are applied to an estimated cornering force operator unit 45 through a differentiator 43, while the estimated yaw rate γ* calculated in the turning movement model 40 is supplied to the estimated cornering force operator unit 45 through a differentiator 44 or directly to the estimated cornering force operator unit 45. When applied with the real forward speed Vx of the vehicle, the estimated cornering force operator unit 45 calculates each estimated cornering force Ff*, Fr* of the front and rear road wheels on a basis of the equations (35) and (36) and applies the calculated cornering forces Ff*, Fr* to a correction coefficient operator unit 51.

The correction coefficient operator unit 51 is applied with each real cornering force Ff, Fr of the front and rear road wheels from a real cornering force operator unit 46. The real cornering force operator unit 46 calculates the real cornering forces Ff, Fr on a basis of the equations (37) and (38) when applied with the real yaw rate γ, a differentiated value dγ/dt of the yaw rate, the real lateral slip angle velocity dβ/dt and the real forward speed Vx of the vehicle. A lateral slip angle velocity operator unit 48 is provided to calculate the real lateral slip angle velocity dβ/dt based on the equation (39) when applied with the actual yaw rate γ, forward speed Vx and lateral acceleration Gy.

The correction coefficient operator unit 51 calculates correction coefficients $\alpha_f$, $\alpha_r$ based on Ff=$\alpha_f$Ff*, Fr=$\alpha_r$Fr*. The calculated correction coefficients $\alpha_f$, $\alpha_r$ are fed back to the turning movement model 40 of the vehicle through low-pass filters 52, 53 and limiters 54, 55. The low-pass filters 52, 53 each are adapted to eliminate high frequency noise, and the limiters 54, 55 each are adapted to maintain the correction coefficients $\alpha_f$, $\alpha_r$ in each range between lower limit values $\alpha_f$min, $\alpha_r$min (for instance, about 0.2) and upper limit values $\alpha_f$max, $\alpha_r$max (for instance, about 0.2).

A state equation or a differential equation of the observer provided as described above is represented as in the equations (24) and (25). When poles $p_1$, $p_2$ of the observer each are selected as an appropriate value (for instance, about −20) to determine factors $k_1$, $k_2$ of the feedback gain K based on the equations (26) and (27), the estimated lateral slip angle β* and yaw rate γ* converge.

Accordingly, when the equation (25) is calculated on basis of the real forward speed Vx of the vehicle, steer-angles δf, δr of the front and rear road wheels, yaw rate γ and lateral acceleration Gy, the estimated lateral slip angle β* and yaw rate γ* can be calculated. In this calculation, the correction coefficients $\alpha_f$, $\alpha_r$ are calculated as each ratio of the real cornering forces Ff, Fr relative to the estimated cornering forces Ff*, Fr* under control of the operator units 45, 46, 48, 51. Thus, the estimated lateral slip angle β* and yaw rate γ* can be accurately calculated on a basis of each cornering power $\alpha_f c_f$, $\alpha_r c_r$ corrected by the correction coefficients $\alpha_f$, $\alpha_r$. In this embodiment, the lateral slip angle and yaw rate of the vehicle can be more accurately estimated since cornering powers $c_f$, $c_r$ of the front and rear road wheels are independently corrected.

Figure 7:
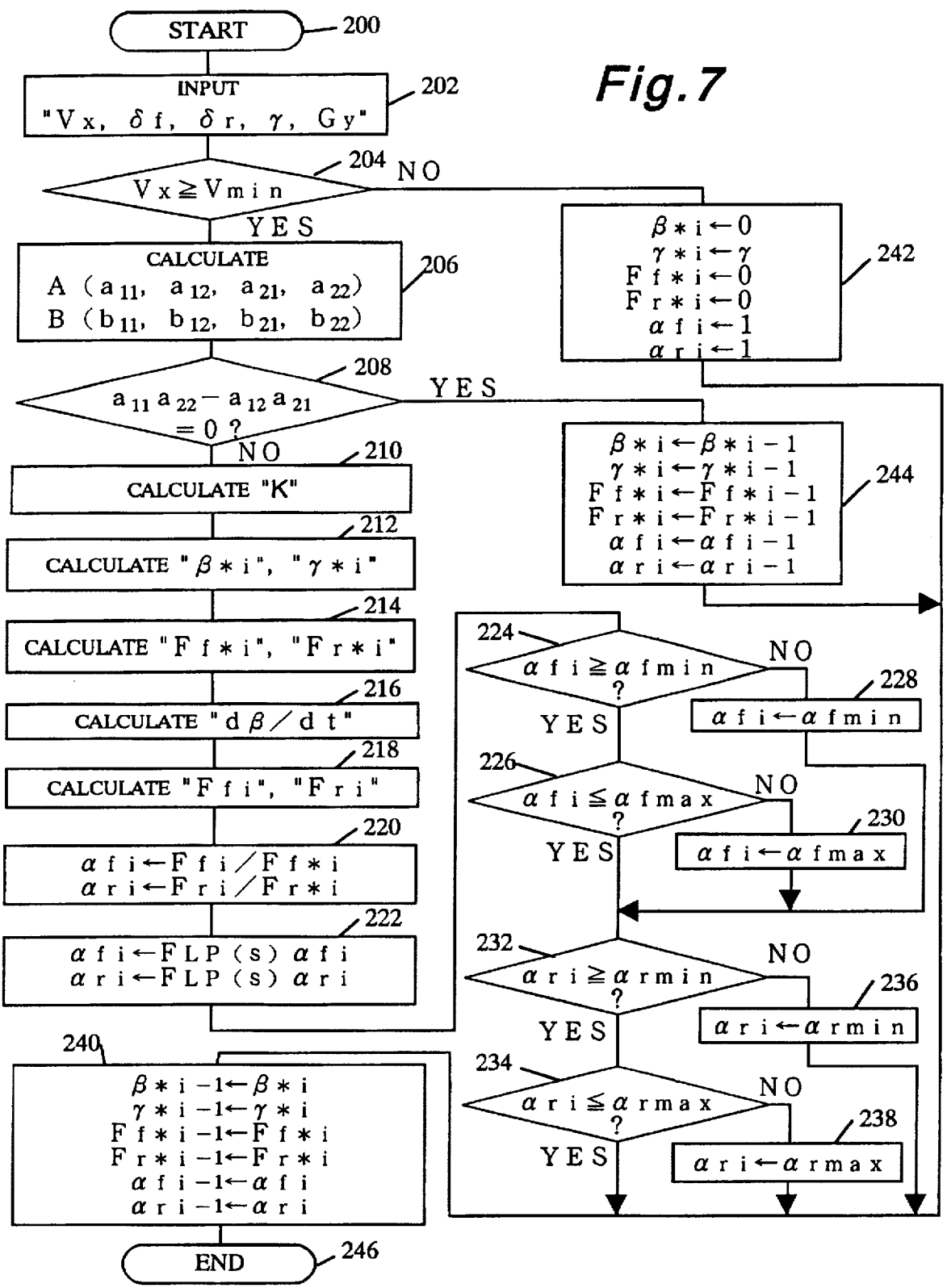
FIG. 7 is a flow chart of a program executed by the microcomputer shown in FIG. 4 in the second practical embodiment.

Hereinafter, a second practical embodiment realized by program processing of the foregoing observer will be described. As shown in FIG. 4, a wheeled vehicle equipped with this embodiment has the vehicle speed sensor 21, steering angle sensors 22, 23, yaw rate sensor 24 and lateral acceleration sensor 25 as in the first practical embodiment. In this embodiment, the microcomputer 30 is programmed to repeatedly execute a program shown by a flow chart in FIG. 7 upon each lapse of the predetermine time T under control of the internal timer.

In operation, the computer 30 starts at step 200 to execute the program and reads out at step 202 input signals respectively indicative of a real forward speed Vx, real steer-angles δf, δr of the front and rear road wheels, a real yaw rate γ and a real lateral acceleration Gy. Subsequently, the computer 30 determines at step 204 whether the forward speed Vx is higher than a predetermined speed Vmin (for instance, 5 Km/h) or not. If the answer at step 204 is "No", the program proceeds to step 242 where the computer 30 sets a presently estimated lateral slip angle β*i as "0", a presently estimated yaw rate γ*i as the real yaw rate γ, presently estimated cornering forces Ff*i, Fr*i of the front and rear road wheels each as "0", and present correction coefficients $\alpha_f$i, $\alpha_r$i each as "1". Thereafter, the computer 30 renews at step 240 previously estimated lateral slip angle $\beta^*i-1$, yaw rate $\gamma^*i-1$, cornering forces $Ff^*i-1$, $Fr^*i-1$ of the front and rear road wheels and correction coefficients $\alpha_f i-1$, $\alpha_r i-1$ with the presently estimated lateral slip angle $\beta^*i$, yaw rate $\gamma^*i$, cornering forces $Ff^*i$, $Fr^*i$ and correction coefficients $\alpha_f i$, $\alpha_r i$ and finishes at step 246 execution of the program.

If the answer at step 204 is "Yes", the program proceeds to step 206 where the computer 30 calculates factors $a_{11}$, $a_{12}$, $a_{21}$, $a_{22}$, $b_{11}$, $b_{12}$, $b_{21}$, $b_{22}$ based on the equations (41) and (42) using the real forward speed Vx of the vehicle and causes the program to proceed to step 208. At step 208, the computer 30 determines whether "$a_{11}a_{22}-a_{12}a_{21}$" is "0" or not. If the answer at step 208 is "Yes", the computer 30 sets at step 244 the presently estimated lateral slip angle $\beta^*i$, yaw rate $\gamma^*i$, cornering forces $Ff^*i$, $Fr^*i$ of the front and rear road wheels and correction coefficients $\alpha_f i$, $\alpha_r i$ as the previously estimated lateral slip angle $\beta^*i-1$, yaw rate $\gamma^*i-1$, cornering forces $Ff^*i-1$, $Fri-1$ and correction coefficient $\alpha_f i-1$, $\alpha_r i-1$. Subsequently, the computer 30 executes the renewal processing at step 240 and finishes at step 246 execution of the program.

If the answer at step 208 is "No", the program proceeds to step 210 where the computer 30 calculates factors $k_1$, $k_2$ of the feedback gain K based on the equations (26) and (27) and causes the program to proceed to step 212. At step 212, the computer 30 calculates the presently estimated lateral slip angle $\beta^*i$ and yaw rate $\gamma^*i$ based on the state equation (25). Subsequently, the computer 30 calculates at step 214 presently estimated cornering forces $Ff^*i$, $Fr^*i$ of the front and rear road wheels based on the equations (35) and (36) and calculates at step 216 the real lateral slip angle velocity $d\beta/dt$ based on the equation (39) using the lateral acceleration Gy, forward speed Vx and yaw rate $\gamma$. At the following step 218, the computer 30 calculates a differential value $d\gamma/dt$ of the real yaw rate $\gamma$ and calculates the real cornering forces $Ff^*i$, $Fr^*i$ of the front and rear road wheels based on the equations (37) and (38) using the calculated differential value $d\gamma/dt$, real lateral slip angle velocity $d\beta/dt$, forward speed Vx and yaw rate $\gamma$. Thereafter, the computer 30 sets each ratio $Ffi/Ff^*i$, $Fri/Fr^*i$ of the real cornering forces Ffi, Fri of the front and rear road wheels to the estimated cornering forces $Ff^*i$, $Fr^*i$ as present correction coefficients $\alpha_f i$, $\alpha_r i$.

After processing at step 220, the computer 30 executes at step 222 the low-pass filter processing defined by the transmission function of the equation (23) to apply it to the calculated correction coefficients $\alpha_f i$, $\alpha_r i$ and executes processing at step 224–238 to define the present correction coefficients $\alpha_f i$, $\alpha_r i$ in each range between the lower limit values $\alpha_f min$, $\alpha_r min$ and upper limit values $\alpha_f max$, $\alpha_r max$. Thereafter, the computer 30 renews at step 240 the previously estimated lateral slip angle $\beta^*i-1$, yaw rate $\gamma^*i-1$, cornering forces $Ff^*i-1$, $Fr^*i-1$ of the front and rear road wheels and correction coefficients $\alpha_f i-1$, $\alpha_r i-1$ with the presently estimated lateral slip angle $\beta^*i$, yaw rate $\gamma^*i$, cornering forces $Ff^*i$, $Fr^*i$ and correction coefficients $\alpha_f i$, $\alpha_r i$ and finishes at step 246 execution of the program.

Consequently, even if each cornering power $c_f$, $c_r$ of the front and rear road wheels changes due to increase of the lateral slip angle, secular change of tires, decrease of a frictional coefficient of the tires on road surfaces, change in distribution of grounding loads of the tires, etc., the cornering power $c_f$, $c_r$ is corrected by the correction coefficients $\alpha_f i$, $\alpha_r i$ so that an estimated lateral slip angle $\beta^*$ and an estimated yaw rate $\gamma^*$ are accurately calculated on a basis of the corrected cornering power. Thus, the estimated lateral slip angle $\beta^*$ can be adapted to various control of the vehicle.

The estimated lateral slip angle $\beta^*$ may be also multiplied by the real forward speed Vx to calculate a lateral velocity $Vy=\beta^* Vx$ for various control of the vehicle.

Hereinafter, a third practical embodiment realized on a basis of the second solution theory of the present invention will be described. In this embodiment, steer-angles $\delta f$, $\delta r$ of the front and rear road wheels, a lateral acceleration Gy and a yaw rate $\delta$ in turning movement of the vehicle are represented by the following equations.

$$dGy/dt=(dFf/dt+dFr/dt)/M \tag{43}$$

$$d^2\psi/dt^2=\{(a_f(dFf/dt)-a_r(Fr/dt)\}/Iz \tag{44}$$

$$dFf/dt=c_p\{(d\delta f/dt)-Gy/Vx+\gamma-a_f(d\psi/dt)/Vx\} \tag{45}$$

$$dFr/dt=c_p\{(d\delta r/dt)-Gy/Vx+\gamma-a_r(d\psi/dt)/Vx \tag{46}$$

When the cornering forces Ff, Fr are eliminated from the equations (43)–(46), a state equation of the turning movement model of the vehicle is represented as described below.

$$\begin{bmatrix} dGy/dt \\ d^2\psi/dt^2 \\ d\psi/dt \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Gy \\ d\psi/dt \\ \gamma \end{bmatrix} + \begin{bmatrix} b_{11} & b_{12} \\ b_{21} & b_{22} \\ b_{31} & b_{32} \end{bmatrix} \begin{bmatrix} d\delta f/dt \\ d\delta r/dt \end{bmatrix} \tag{47}$$

Provided that, factors $a_{11}$, $a_{12}$, $a_{13}$, $a_{21}$, $a_{22}$, $a_{23}$, $a_{31}$, $a_{32}$, $a_{33}$ of the system determinant and factors $b_{11}$, $b_{12}$, $b_{21}$, $b_{22}$, $b_{31}$, $b_{32}$ of the control determinant are represented by the following equations.

$$a_{11}=-2c_p/MVx \tag{48}$$

$$a_{12}=-(a_f c_p-a_r c_p)/MVx \tag{49}$$

$$a_{13}=2c_p/M \tag{50}$$

$$a_{21}=-(a_f c_p-a_r c_p)/I_z Vx \tag{51}$$

$$a_{22}=-(a_f^2 c_p+a_r^2 c_p)/I_z Vx \tag{52}$$

$$a_{23}=(a_f c_p-a_r c_p)/I_z \tag{53}$$

$$a_{31}=0\, a_{32}=1\, a_{33}=0 \tag{54}$$

$$b_{11}=b_{12}=c_p/M \tag{55}$$

$$b_{21}=a_f c_p/I_z \tag{56}$$

$$b_{22}=-a_r c_p/I_z \tag{57}$$

$$b_{31}=b_{32}=0 \tag{58}$$

An observer provided on a basis of the state equation (47) is applied with the lateral acceleration Gy as an observable variable (a reference input), and the specification M, $I_z$, $a_f$, $a_r$, $C_p$ of the vehicle each are defined as constant. Thus, a yaw acceleration $d\gamma/dt$ and a yaw rate $\gamma$ can be estimated together with the lateral acceleration Gy when the forward speed Vx, the steer-angle speeds $d\delta f/dt$, $d\delta r/dt$ of the front and rear road wheels and the lateral acceleration Gy are detected. In this case, a variable estimated in the observer is referred to an estimated variable, and each estimated variable is represented with a star mark *.

When the cornering power $c_p$ changes as shown in FIGS. 10 and 11, accurate estimation of the yaw acceleration and yaw rate may not be effected as in the first embodiment. Accordingly, in this embodiment, a correction coefficient $\alpha$ of the cornering power $c_p$ is estimated, and a cornering power in the observer is represented as $\alpha c_p$. As described in the first embodiment, the correction coefficient $\alpha$ is represented as $\alpha=Gy/Gy^*$. As a result, when the correction coefficient $\alpha$ is fed back to the turning movement model of the vehicle and multiplied by the cornering power $c_p$ in the observer to correct the cornering power $c_p$, an estimated lateral acceleration Gy*, an estimated yaw acceleration $d\gamma/dt^*$ and an estimated yaw rate $\gamma$ can be calculated.

Figure 8:
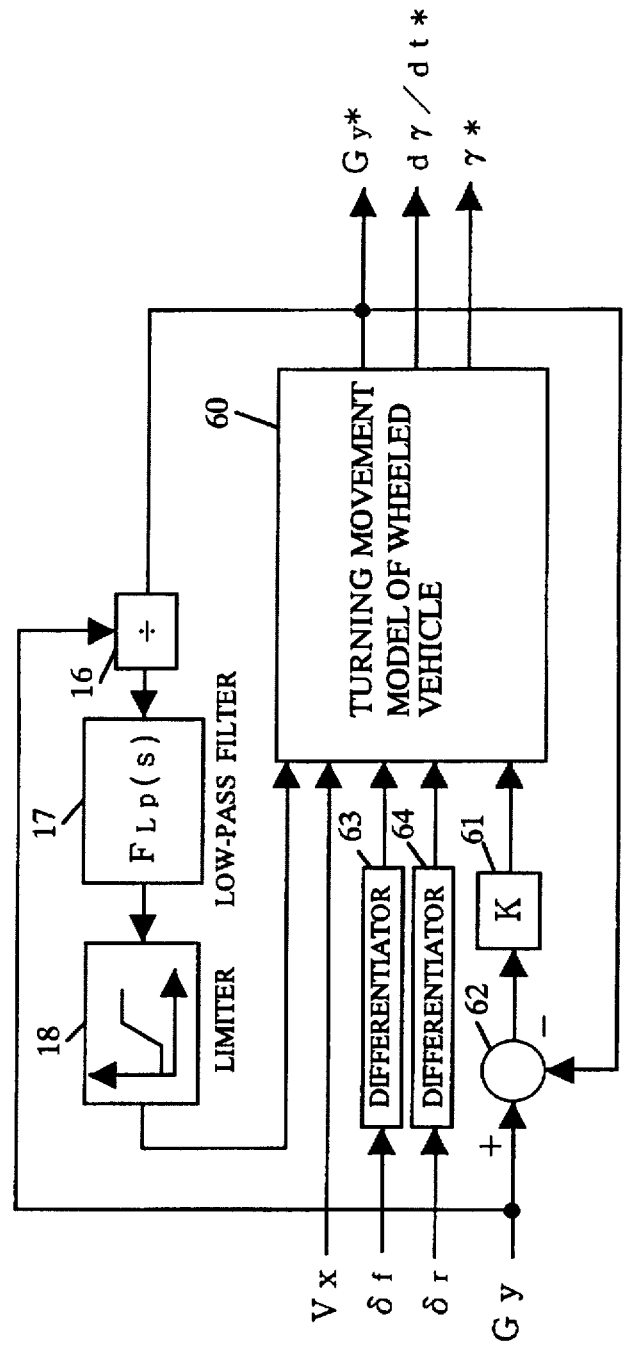
FIG. 8 is a block diagram of an observer including a turning movement model of a wheeled vehicle in the third practical embodiment of the present invention and a correction circuit for correcting a cornering power in the observer.

Hereinafter, an observer provided on a basis of the foregoing theory will be described with reference to FIG. 8. The observer includes a turning movement model 60 of the vehicle, a gain operator unit 61 to be applied with a lateral acceleration Gy and a deviation operator unit 62. The turning movement model 60 is applied with steer-angle speeds $d\delta f/dt$, $d\delta r/dt$ of the front and rear road wheels through differentiators 63, 64. A state equation $dX/dt = AX + BU$ of the turning movement model 60 is represented by the following equations (59)–(70), and an output equation $Y = Cx$ is represented by the following equation (71).

$$\begin{bmatrix} dGy^*/dt \\ d^2\gamma^*/dt^2 \\ d\gamma^*/dt \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Gy^* \\ d\gamma^*/dt \\ \gamma^* \end{bmatrix} + \begin{bmatrix} b_{11} & b_{12} \\ b_{21} & b_{22} \\ b_{31} & b_{32} \end{bmatrix} \begin{bmatrix} d\delta f/dt \\ d\delta r/dt \end{bmatrix} \quad (59)$$

$$a_{11} = -2\alpha c_p/MVx \quad (60)$$

$$a_{12} = -\alpha c_p(a_f - a_r)/MVx \quad (61)$$

$$a_{13} = 2\alpha c_p/M \quad (62)$$

$$a_{21} = -\alpha c_p(a_f - a_r)/I_z Vx \quad (63)$$

$$a_{22} = -\alpha c_p(a_f^2 + a_r^2)/I_z Vx \quad (64)$$

$$a_{23} = \alpha c_p(a_f - a_r)/I_z \quad (65)$$

$$a_{31} = 0 a_{32} = 1 a_{33} = 0 \quad (66)$$

$$b_{11} = b_{12} = \alpha c_p/M \quad (67)$$

$$b_{21} = a_f \alpha c_p/I_z \quad (68)$$

$$b_{22} = -a_r \alpha c_p/I_z \quad (69)$$

$$b_{31} = b_{32} = 0 \quad (70)$$

$$Y = [1\ 0\ 0] \begin{bmatrix} Gy^* \\ d\gamma/dt \\ \gamma^* \end{bmatrix} \quad (71)$$

The gain operator unit 61 multiplies the deviation Gy–Gy* from the deviation operator unit 62 by the gain K defined by the following equation (72) and feeds bake a resultant of the multiplication to the turning movement model 60.

$$\begin{bmatrix} k_1 \\ k_2 \\ k_3 \end{bmatrix} \quad (72)$$

The turning movement model 60 of the vehicle is provided with a feedback circuit including a subtracter 16, a low-pass filter 17 and a limiter 18 for correction of a factor of the cornering power $c_p$ in the movement model 60. The subtracter 16 subtracts the actual lateral acceleration Gy from the lateral acceleration Gy* estimated in the movement model 60 to calculate a correction coefficient $\alpha$. the low-pass filter 17 and limiter 18 are the same as those in the first embodiment.

A state equation or a differential equation of the observer is represented as described below.

$$dX^*/dt = (A - KC)X^* + KGy + BU \quad (73)$$

The state equation (73) is rewritten into the following equation using the factors defined by the equations (59)–(72).

$$\begin{bmatrix} dGy^*/dt \\ d^2\gamma^*/dt^2 \\ d\gamma^*/dt \end{bmatrix} = \begin{bmatrix} a_{11} - k_1 & a_{12} & a_{13} \\ a_{21} - k_2 & a_{22} & a_{23} \\ a_{31} - k_3 & a_{32} & a_{33} \end{bmatrix} \begin{bmatrix} Gy^* \\ d\gamma^*/dt \\ \gamma^* \end{bmatrix} + \begin{bmatrix} k_1 \\ k_2 \\ k_3 \end{bmatrix} Gy + \begin{bmatrix} b_{11} & b_{12} \\ b_{21} & b_{22} \\ b_{31} & b_{32} \end{bmatrix} \begin{bmatrix} d\delta f/dt \\ d\delta r/dt \end{bmatrix} \quad (74)$$

When poles P1, p2, p3 of the observer each are selected as an appropriate value (for instance, a value of about −20), the estimated lateral acceleration Gy*, yaw acceleration $dc/dt^*$ and yaw rate c* converge. Provided that, the factors k1, k2, k3 of the feedback gain K in the equation (74) are represented by the following equations (75)–(78).

$$k_1 = a_{11} + a_{22} + a_{33} - p_1 - p_2 - p_3 \quad (75)$$

$$k_2 = a_{22} + \quad (76)$$
$$[(a_{12}a_{23} - a_{13}a_{22})\{(a_{22} + a_{33})$$
$$(a_{22} + a_{33} - p_1 - p_2 - p_3) - a_{22}a_{33} + a_{23}a_{32} +$$
$$p_1 p_2 + p_2 p_3 + p_3 p_1\} + a_{13}\{(a_{22}a_{33} - a_{23}a_{32})$$
$$(a_{22} + a_{33} - p_1 - p_2 - p_3) + p_1 p_2 p_3\}]/Kb$$

$$k_3 = a_{31} + \quad (77)$$
$$[(a_{12}a_{33} - a_{32}a_{13})\{(a_{22} + a_{33})$$
$$(a_{22} + a_{33} - p_1 - p_2 - p_3) - a_{22}a_{33} + a_{23}a_{32} +$$
$$p_1 p_2 + p_2 p_3 + p_3 p_1\} - a_{21}\{(a_{22}a_{33} - a_{23}a_{32})$$
$$(a_{22} + a_{33} - p_1 - p_2 - p_3) + p_1 p_2 p_3\}]/Kb$$

$$Kb = a_{12}^2 a_{23} - a_{13}^2 a_{32} - a_{12}a_{13}a_{22} + a_{12}a_{13}a_{33} \quad (78)$$

Provided that, $a_{31} = a_{33} = 0$, $a_{32} = 1$.

The observer is applied with a real forward speed Vx of the vehicle, real steer-angle speeds $d\delta f/dt$, $d\delta r/dt$ of the front and rear road wheels and a real lateral acceleration Gy to calculate an estimated lateral acceleration Gy*, an estimated yaw acceleration $d\gamma/dt^*$ and an estimated yaw rate $\gamma^*$ by solution of the state equation (74). In this calculation, a correction coefficient $\alpha$ is calculated as a ratio of the real lateral acceleration Gy to the estimated lateral acceleration Gy* under control of the subtracter 16, low-pass filter 17 and limiter 18. Thus, the cornering power $\alpha c_p$ is corrected by the correction coefficient $\alpha$ to accurately calculate the estimated lateral acceleration Gy*, yaw acceleration $d\gamma/dt^*$ and yaw rate $\gamma^*$.

Figure 9:
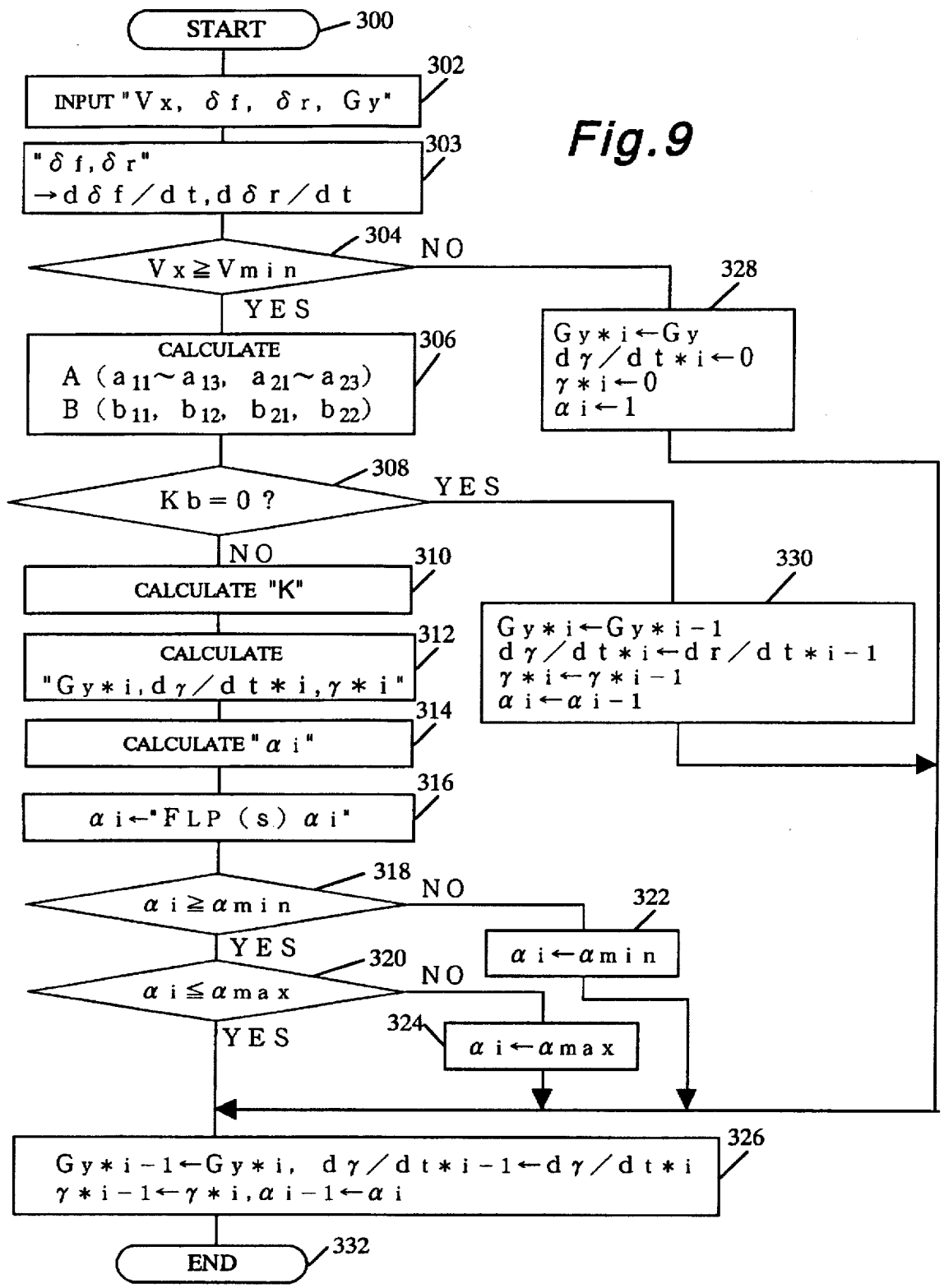
FIG. 9 is a flow chart of a program executed by the microcomputer shown in FIG. 4 in the third practical embodiment.

Hereinafter, a practical embodiment realized by program processing of the observer will be described with reference to FIG. 4. In this practical embodiment, the microcomputer 30 is programmed to repeatedly execute a program shown by a flow chart in FIG. 9 at the predetermined time interval T under control of the internal timer.

In operation, the computer 30 starts at step 300 to execute the program and reads out at step 302 input signals respectively indicative of a real forward speed Vx of the vehicle, real steer-angles $\delta f$, $\delta r$ and a real acceleration Gy from the sensors 21–23 and 25. Subsequently, the computer 30 calculates steer-angle speeds $d\delta f/dt$, $d\delta r/dt$ of the front and rear road wheels by time differentiation of the steer-angles $\delta f$, $\delta r$. Thereafter, if the forward speed Vx is less than a predetermined speed Vmin, the computer 30 determines a "No" answer at step 304 and set at step 328 a presently estimated lateral acceleration Gy*i as the real lateral acceleration Gy, a presently estimated yaw acceleration $d\gamma/dt^*i$ as "0", a presently estimated yaw rate $\gamma^*i$ as "0" and a presently estimated correction coefficient αi as "1". Subsequently, the computer 30 renews at step 326 a previously estimated lateral acceleration Gy*i-1, a previously estimated yaw acceleration dγ/dt*i-1, a previously estimated yaw rate γ*i-1 and a previous correction coefficient αi-1 with the presently estimated lateral acceleration Gy*i, yaw acceleration dγ/dt*i, yaw rate γ*i and correction coefficient αi and finishes at step 332 execution of the program.

If the forward speed Vx is more than the predetermined speed Vmin, the computer 30 determines a "Yes" answer at step 304 and executes at step 306 the equations (60)–(70) using the forward speed Vx to calculate factors $a_{11}$, $a_{12}$, $a_{13}$, $a_{21}$, $a_{22}$, $a_{23}$, $a_{31}$, $a_{32}$, $a_{33}$, $b_{11}$, $b_{12}$, $b_{21}$, $b_{22}$, $b_{31}$, $b_{32}$. In this instance, the factors $a_{31}$, $a_{32}$, $a_{33}$, $b_{31}$, $b_{32}$ are set as "0" or "1". After processing at step 306, the computer 30 determines at step 308 whether the value Kb of the equation (78) is "0" or not. If the value Kb is "0", the computer 30 determines a "Yes" answer at step 308 and sets at step 330 the presently estimated lateral acceleration Gy*i, yaw acceleration dγ/dt*i, yaw rate γ*i and correction coefficient αi as the previously estimated lateral acceleration Gy*i-1, yaw acceleration dγ/dt*i-1, yaw rate γ*i-1 and correction coefficient αi-1. After processing at step 330, the computer 30 executes renewal processing at step 326 and finishes at step 332 execution of the program.

If the answer at step 308 is "No", the computer 30 executes the equations (74)–(77) at step 310 and 312 to calculate factors $k_1$, $k_2$, $k_3$ of the feedback gain K and the presently estimated lateral acceleration Gy*i, yaw acceleration dγ/dt*i and yaw rate γ*i. Subsequently, the computer 30 calculates the present correction coefficient αi at step 314, executes the low-pass filter processing at step 316 and executes processing for defining the correction coefficient αi in a range between upper and lower limits αmin and αmax at step 318–324. Thereafter, the computer 30 executes renewal processing of the previously estimated values Gy*i-1, dγ/dt*i-1, γ*i-1 and ad-1 at step 326 and finishes execution of the program at step 332.

Consequently, even if each cornering power $c_p$ of the front and rear road wheels changes in various conditions, change of the cornering power $c_p$ is corrected by the correction coefficient αi so that the estimated lateral acceleration Gy*, yaw acceleration dγ/dt* and yaw rate γ* are accurately calculated on a basis of the corrected cornering power. Thus, an estimated lateral slip angle b calculated on a basis of the estimated lateral acceleration Gy*, yaw acceleration dγ/dt* and yaw rate γ* can be adapted for various control of the vehicle.

Although in the third practical embodiment, the steer-angle sensors 22 and 23 are provided to detect steer-angles δf, δr of the front and rear road wheels for calculation of the steer-angle speeds dδf/dt, dδr/dt of the front and rear road wheels, the steer-angle sensors may be arranged to directly detect the steer-angle speeds dδf/dt, dδr/dt of the front and rear road wheels. In such a case, the steer-angle speed dδf/dt, dδr/dt of the front and rear road wheels are read out from the sensors at step 302, and the processing at step 303 becomes unnecessary.

In the case that the present invention is adapted to a two-wheel steered vehicle, the rear wheel steer-angle δr and steer-angle speed dδr/dt each are defined as "0". Although in the first to third practical embodiments, the lateral slip angel β, yaw rate γ, lateral acceleration Gy and yaw acceleration dγ/dt have been used as state variables of the observer, other movement state variables such as a lateral velocity, a lateral slip angle velocity and like of the vehicle may be used as the state variables of the observer.

What is claimed is:

1. An estimation method of estimating first and second movement state variables in turning of a wheeled vehicle on a basis of a state equation of an observer to be applied with a first real movement state variable corresponding with the first movement state variable as a reference input, said observer being designed on a basis of a turning movement model which defines a real physical variable indicative of a steer-angle of the vehicle as an input variable and defines the first and second movement state variables each as a state variable, wherein the estimation method comprises the steps of:

detecting the real physical variable and the first real movement state variable for estimating the first and second movement state variables and further detecting a third real movement state variable in turning of the vehicle, different from the first and second movement state variables;

estimating a third movement state variable corresponding with the detected third real movement state variable on a basis of either one of the estimated first and second movement state variables;

calculating a correction value for correction of a cornering power defined in the state equation of said observer on a basis of a difference between the detected third real movement state variable and the estimated third movement state variable; and correcting a factor of the cornering power by the calculated correction value.

2. An estimation method of estimating a lateral slip angle and yaw rate of a wheeled vehicle on a basis of a state equation of an observer to be applied with a real yaw rate corresponding with the yaw rate as a reference input, said observer being designed on a basis of a turning movement model which defines a real steer-angle of the vehicle as an input variable and defines the lateral slip angle and the yaw rate each as a state variable, wherein the estimation method comprises the steps of:

detecting the real yaw rate and the real steer-angle for estimating the lateral slip angle and yaw rate and further detecting a real forward speed and a real lateral acceleration of the vehicle;

estimating a lateral acceleration of the vehicle based on the estimated lateral slip angle and yaw rate and the detected forward speed of the vehicle;

calculating a correction coefficient based on a ratio of the detected real lateral acceleration to the estimated lateral acceleration; and multiplying a factor of a cornering power defined in the state equation of said observer by the calculated correction coefficient.

3. An estimation method of estimating a lateral slip angle and yaw rate of a wheeled vehicle based on a state equation of an observer to be applied with a real yaw rate corresponding with the yaw rate as a reference input, said observer being designed on a basis of a turning movement model which defines a real steer-angle of the vehicle as an input variable and defines the lateral slip angle and the yaw rate as a state variable, wherein the estimation method comprises the steps of;

detecting the real yaw rate and the real steering-angle for estimating the lateral slip angle and yaw rate and further detecting a real forward speed and a real lateral acceleration of the vehicle, calculating a cornering force based on the detected real forward speed, yaw rate and lateral acceleration;

estimating a cornering force based on the estimated lateral slip angle and yaw rate and the detected real forward speed;

calculating a correction coefficient based on a ratio of the calculated cornering force relative to the estimated cornering force; and multiplying a factor of the estimated cornering force by the calculated correction coefficient.

4. An estimation method of estimating first and second movement state variables in turning of a wheeled vehicle based on a state equation of an observer to be applied with a first real movement state variable corresponding with the first movement state variable as a reference input, said observer being designed on a basis of a turning movement model which defines a real physical variable indicative of a steer-angle of the vehicle as an input variable and defines the first and second movement state variables each as a state variable, wherein the estimation method comprises the steps of:

detecting the real physical variable and the first real movement state variable for estimating the first and second movement state variables;

calculating a correction value for correction of a cornering power defined in the state equation of said observer on a basis of a difference between the detected first real movement state variable and the estimated first movement state variable; and correcting a factor of the cornering power on the basis of the calculated correction value.

5. An estimation method of estimating a movement state variable including at least a lateral acceleration in turning a wheeled vehicle on a basis of a state equation of an observer to be applied with a real lateral acceleration corresponding with the movement state variable as a reference input, said observer being designed on a basis of a turning movement model which defines a real steer-angie of the vehicle as an input variable and defines the movement state variable as the state variable, wherein the estimation method comprises the steps of:

detecting the real steer-angle speed and the real lateral acceleration of the vehicle for estimating the movement state variable;

calculating a correction coefficient based on a ratio of the detected real lateral acceleration to the lateral acceleration estimated on a basis of the state equation of said observer; and multiplying a factor of a cornering power defined in the state equation of said observer by the calculated correction coefficient.

* * * * *

UNITED STATES PATENT AND TRADEMARK OFFICE
CERTIFICATE OF CORRECTION

PATENT NO. : 5,765,118

DATED : 9 June 1998

INVENTOR(S) : Katsumi FUKATANI

It is certified that error appears in the above-identified patent and that said Letters Patent is hereby corrected as shown below:

In the Abstract, line 2: Change "or" to --of--.

| Column | Line | |
|---|---|---|
| 2 | 43 | Change "prevent" to --present--. |
| 6 | 40 | Change "$\frac{ac_p}{I_z} \frac{ac_p}{I_z}$" to --$\frac{ac_p}{I_z} - \frac{ac_p}{I_z}$--. |
| 6 | 62 | Change "aFf*" to --$\alpha$Ff*--; change "aFr*" to --$\alpha$Fr*--. |
| 6 | 66 | Change "aFf*" to --$\alpha$Ff*--; change "aFr*" to --$\alpha$Fr*--. |
| 7 | 42 | Change ""$\frac{ac_p}{I_z} \frac{ac_p}{I_z}$" to --$\frac{ac_p}{I_z} - \frac{ac_p}{I_z}$--. |

UNITED STATES PATENT AND TRADEMARK OFFICE
CERTIFICATE OF CORRECTION

PATENT NO. : 5,765,118
DATED : 9 June 1998
INVENTOR(S) : Katsumi FUKATANI

It is certified that error appears in the above-identified patent and that said Letters Patent is hereby corrected as shown below:

| Column | Line | |
|---|---|---|
| 7 | 64 | Change "$Gy^*=(d\beta S^*/dt+\gamma^*) V_x$" to --$Gy^*=(d\beta^*/dt+\gamma^*) V_x$--. |
| 8 | 10 | Change "amin" to --$\alpha$min--. |
| 8 | 62 | Change "predetermine" to --predetermined--. |
| 9 | 35 | Change "$\gamma r^*i$" to --$\gamma^*i$--. |
| 10 | 8 | Change "various control" to --various controls--. |
| 10 | 11 | Change "various control" to --various controls--. |
| 12 | 52 | Change "predetermine" to --predetermined--. |
| 13 | 67 | Change "various control" to --various controls--. |
| 14 | 3 | Change "various control" to --various controls--. |
| 17 | 47 | Change "various control" to --various controls--. |

UNITED STATES PATENT AND TRADEMARK OFFICE
CERTIFICATE OF CORRECTION

PATENT NO. : 5,765,118
DATED : 9 June 1998
INVENTOR(S) : Katsumi FUKATANI

It is certified that error appears in the above-identified patent and that said Letters Patent is hereby corrected as shown below:

| Column | Line | |
|---|---|---|
| 14 | 52 | Change "$C_p$" to --$c_p$--. |
| 15 | 32 | Change "$a_{31}=0 a_{32}=1 a_{33}=0$" to --$a_{31}=0\ a_{32}=1\ a_{33}=0$--. |
| 15 | 46 | Change "bake" to --back--. |
| 16 | 34 | Change "$Kb=a^2{}_{12}a_{23}-a^2{}_{13}a_{32}$" to --$Kb=a_{12}{}^2 a_{23}-a_{13}{}^2 a_{32}$--. |
| 16 | 64 | Change "set" to --sets--. |
| 17 | 62 | Change "angel" to --angle--. |
| 20 | 10 | Change "steer-angie" to --steer-angle--. |

Signed and Sealed this

Twenty-third Day of March, 1999

Attest:

Q. TODD DICKINSON

Attesting Officer

Acting Commissioner of Patents and Trademarks